United States Patent  (10) Patent No.: US 7,734,839 B1
Sivertsen                  (45) Date of Patent:    Jun. 8, 2010

(54) METHOD AND INTEGRATED CIRCUIT FOR PROVIDING ENCLOSURE MANAGEMENT SERVICES UTILIZING MULTIPLE INTERFACES AND PROTOCOLS

(75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 1164 days.

(21) Appl. No.: 11/211,271

(22) Filed: Aug. 25, 2005

(51) Int. Cl.
*G06F 3/00* (2006.01)
*G06F 13/00* (2006.01)

(52) U.S. Cl. .................. 710/11; 710/105; 710/315; 709/230

(58) Field of Classification Search ............ 710/10–12, 710/104–105, 314–315; 709/230–237
See application file for complete search history.

(56) References Cited

U.S. PATENT DOCUMENTS

| 6,078,979 | A | 6/2000 | Li et al. |
| 6,145,020 | A | 11/2000 | Barnett |
| 6,374,317 | B1 | 4/2002 | Ajanovic et al. |
| 6,957,291 | B2 | 10/2005 | Moon et al. |
| 6,993,772 | B2 | 1/2006 | Pike et al. |
| 7,110,928 | B1* | 9/2006 | Lee .............................. 703/13 |
| 7,373,371 | B2 | 6/2008 | Kasahara |
| 2004/0193973 | A1* | 9/2004 | Porat et al. ................. 714/710 |
| 2005/0138154 | A1* | 6/2005 | Seto ........................... 709/223 |
| 2005/0182881 | A1* | 8/2005 | Chou et al. .................. 710/301 |
| 2006/0149881 | A1 | 7/2006 | Clayton et al. |
| 2006/0194460 | A1 | 8/2006 | Chen et al. |
| 2006/0212760 | A1* | 9/2006 | Swoboda ....................... 714/38 |
| 2007/0079032 | A1 | 4/2007 | Bissessur et al. |

OTHER PUBLICATIONS

SFF-8485 Specification for Serial GPIO (SGPIO) Bus, Revision 0.5 (Feb. 3, 2005).
U.S. Appl. No. 11/837,256, filed Aug. 10, 2007 entitled "Detecting the Presence and Activity of a Mass Storage Device", Inventor: Clas Gerhard Sivertsen.

(Continued)

*Primary Examiner*—Christopher B Shin
(74) *Attorney, Agent, or Firm*—Hope Baldauff Hartman, LLC (57) ABSTRACT

A method and integrated circuit for providing enclosure management services compatible with a multitude of physical interfaces and protocols for exchanging enclosure management data between an HBA and an enclosure management backplane is provided. According to one method, two or more interfaces utilized for exchanging enclosure management data may be monitored to determine whether one of the interfaces is actively being utilized by an HBA to transmit enclosure management data. If one of the interfaces is identified as being active, a determination is then made as to which of a plurality of protocols for transferring enclosure management data is being utilized on the active interface. In particular, a determination may be made as to whether a protocol defined by one HBA manufacturer is being utilized or whether another protocol defined by another HBA manufacturer is being utilized. Alternatively, a determination may be made as to whether one of a multitude of different protocols defined by the same manufacturer is being utilized. Once the interface and protocol have been identified, enclosure management data received on the active interface is decoded utilizing the identified protocol.

19 Claims, 7 Drawing Sheets

OTHER PUBLICATIONS

U.S. Notice of Allowance / Allowability dated Oct. 20, 2009 in U.S. Appl. No. 11/837,256.
U.S. Appl. No. 11/837,287, filed Aug. 10, 2996, entitled "Combining Multiple SGPIO Streams to Provide Device Status Indicators," Inventor: Clas Gerhard Sivertsen.
U.S. Official Action dated May 26, 2009 in U.S. Appl. No. 11/837,287.
U.S. Appl. No. 12/363,077, filed Jan. 30, 2009, entitled "Multiple Frequency State Detection for Serial I/O Interfaces," Inventor: Kayalvizhi Dhandapani.

* cited by examiner

METHOD AND INTEGRATED CIRCUIT FOR PROVIDING ENCLOSURE MANAGEMENT SERVICES UTILIZING MULTIPLE INTERFACES AND PROTOCOLS

TECHNICAL FIELD

The present invention is related to the management of data storage device enclosures. More particularly, the present invention is related to providing enclosure management services compatible with multiple physical interfaces and multiple protocols used to exchange enclosure management data.

BACKGROUND OF THE INVENTION

In large scale computing systems, it is often necessary to provide an operator with detailed information regarding the presence and status of mass storage devices. In order to provide such functionality, many storage solutions utilize a backplane with an integrated enclosure management device, referred to herein as an "enclosure management backplane." In addition to performing other functions, an enclosure management backplane provides facilities for generating visual indicators based upon enclosure management data received from a connected host bus adapter ("HBA"). For instance, in some solutions, individual light-emitting diodes ("LEDs") may be driven by an enclosure management backplane for displaying information regarding the activity, failure, rebuild status, and other information for each of the mass storage devices connected to the enclosure management backplane. In order to provide these indicators and other types of functionality, an enclosure management backplane typically provides connections for multiple mass storage devices, such as hard disk drives. The backplane also interfaces with an HBA and provides an interface through which the HBA may communicate with the mass storage devices. An enclosure management backplane also may receive and transmit enclosure management data to and from the HBA. Enclosure management data is any data relating to the provision of enclosure management services by a backplane.

Several different physical interfaces may be utilized to deliver enclosure management data between a HBA and an enclosure management backplane. For instance, some Serial Attached SCSI ("SAS")-compatible HBAs are equipped with a serial general purpose input/output interface ("SGPIO"). Some Serial Advanced Technology Attachment ("SATA")-compatible HBAs, on the other hand, utilize a control or management bus, such as the I²C bus from PHILIPS SEMI-CONDUCTORS, to exchange enclosure management data between the enclosure management backplane and the HBA. For various reasons, some vendors have decided on some HBA models, to implement an enclosure management protocol based on the I²C bus, even for SAS HBAs, which could be for backward compatibility reasons with SATA backplanes.

The particular protocol utilized to transfer enclosure management data between the enclosure management backplane and the HBA may also vary from solution to solution. For instance, the Small Computer Systems Interface ("SCSI") Accessed Fault-Tolerant Enclosures Interface Specification ("SAF-TE") is typically utilized with SATA HBAs utilizing the I²C management bus. Alternatively, the SGPIO protocol may be utilized with a SAS HBA utilizing an SGPIO interface to exchange enclosure management information between an HBA and an enclosure management backplane.

In addition to the standard protocols utilized for the transfer of enclosure management information, it is very common for HBA manufacturers to define their own proprietary protocols. In many cases, an HBA manufacturer will utilize a standard protocol, such as SGPIO or SAF-TE, as the foundation for its protocol but will modify the standard protocol to define its own proprietary protocol. For instance, an HBA manufacturer may change the order that data is presented or add particular proprietary data to the protocol.

In order to provide backplane solutions supporting the various physical interfaces for exchanging enclosure management data, the various standard protocols for exchanging enclosure management data, and the various manufacturer-specific protocols for exchanging enclosure management data, it has previously been necessary to provide backplanes configured for each particular combination of physical interface and protocol. However, providing a separate backplane for each combination of physical interface and protocol can be extremely cost-inefficient and time consuming.

It is with respect to these considerations and others that the present invention has been made.

SUMMARY OF THE INVENTION

In accordance with the present invention, the above and other problems are solved by a method and integrated circuit for providing enclosure management services compatible with a multitude of physical interfaces and protocols for exchanging enclosure management data between an HBA and an enclosure management backplane. According to one aspect of the invention, the method and integrated circuit are operative to identify the physical interface and the protocol being utilized to exchange enclosure management information, thereby eliminating the need for backplanes customized for particular physical interface/protocol combinations.

According to one method provided by an embodiment of the invention, two or more interfaces utilized for exchanging enclosure management data may be monitored to determine whether one of the interfaces is actively being utilized by an HBA to transmit enclosure management data. If one of the interfaces is identified as being active, a determination is then made as to which of a plurality of protocols for transferring enclosure management data is being utilized on the active interface. In particular, a determination may be made as to whether a protocol defined by one HBA manufacturer is being utilized or whether another protocol defined by another HBA manufacturer is being utilized. Alternatively, a determination may be made as to whether one of a multitude of different protocols defined by the same manufacturer is being utilized. Once the interface and protocol have been identified, enclosure management data received on the active interface is decoded utilizing the identified protocol.

According to other aspects of the invention, the determination as to which protocol is being utilized on the active interface may be performed by examining the actual data received on the active interface. In particular, data identifying the manufacturer, and thereby identifying the protocol, may be identified in the enclosure management data stream. The ordering of data bytes within the enclosure management data may also be particular to certain manufacturers and thereby indicate the protocol being used. Additionally, key bytes may be present within the enclosure management data that identify the manufacturer of the HBA and thereby also identify the protocol being used. For instance, certain manufacturers may encode predefined data values at certain predefined locations within a stream of enclosure management data. Likewise, the destination memory addresses specified within certain bytes of enclosure management data may provide an indication as to the manufacturer of the HBA and, therefore, to the protocol utilized to encode the data. Other methods are also provided by the embodiments of the invention for identifying the protocol in use on the active interface.

According to other aspects of the invention, an integrated circuit for providing enclosure management services is provided. The integrated circuit is compatible with multiple enclosure management interfaces and with multiple enclosure management protocols, including manufacturer-specific enclosure management protocols. According to aspects of the invention, the integrated circuit includes a first enclosure management data interface, such as a GPIO interface. The integrated circuit also includes a second enclosure management data interface, such as an I²C interface. The integrated circuit also includes a processing portion for monitoring the interfaces to determine whether one of the interfaces is active by determining whether enclosure management data has been received on one of the interfaces.

If the processing portion determines that enclosure management data has been received on an interface, the processing portion is further operative to determine if data received on the active interface is formatted according to a first enclosure management protocol or a second enclosure management protocol. In particular, a determination may be made as to whether the data received on the active interface is formatted according to a protocol defined by a first manufacturer or a protocol defined by a second manufacturer. If the processing portion determines that the data received on the active interface is formatted according to a protocol defined by the first manufacturer, the processing portion is operative to decode the data according to the protocol defined by the first manufacturer. If the processing portion determines that the data received on the active interface is formatted according to a protocol defined by the second manufacturer, the processing portion is operative to decode the data according to the protocol defined by the second manufacturer.

According to other aspects, the processing portion of the integrated circuit may be further operative to determine whether the data received on the active interface is formatted according to a first protocol defined by a first manufacturer or according to a second protocol defined by the first manufacturer. If the processing portion determines that the data received on the active interface is formatted according to a first protocol defined by the first manufacturer, the processing portion is operative to decode the data according to the first protocol defined by the first manufacturer. If the processing portion determines that the data received on the active interface is formatted according to a second protocol defined by the first manufacturer, the processing portion is operative to decode the data according to the second protocol defined by the first manufacturer.

According to additional aspects, the processing portion may identify the particular enclosure management protocol utilized on the active interface by detecting a manufacturer identifier in the enclosure management data received on the active interface, by detecting an ordering of bytes within the data that are indicative of the protocol or manufacturer, by identifying one or more key bytes in the data that are indicative of the protocol or manufacturer, or by identifying one or more destination memory addresses for the data that are indicative of the protocol or manufacturer.

According to other aspects of the invention, the integrated circuit also includes an output portion for generating an indication, such as a visual or audible indicator, that a mass storage device is active. Such an indication may be generated in response to receiving enclosure management data on the active interface indicating that the mass storage device is active. For instance, the output portion may be configured to drive a LED indicating that the device is active.

According to additional aspects, the integrated circuit may include another output portion for generating an indication, such as a visual or audible indicator, that a mass storage device has failed. Such an indication may be generated in response to receiving enclosure management data on the active interface indicating that the mass storage device has failed. For instance, the output portion may be configured to drive a LED indicating that the device has failed.

According to yet another aspect, another output portion may be provided in the integrated circuit for communicating data received on the active interface to another similarly configured integrated circuit. In this manner, multiple integrated circuits may be combined to provide interface- and protocol-independent enclosure management functions for virtually any number of mass storage devices utilizing a single enclosure management data communications interface.

The above-described aspects of the invention may also be implemented as a computer-controlled apparatus, a computer process, a computing system, an apparatus, as an article of manufacture such as a computer program product or computer-readable medium, or as a semiconductor integrated circuit, including but not limited to a custom application specific integrated circuit, a programmable micro-controller type device, or a field-programmable gate array device. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Embodiments of the present invention provide a method and integrated circuit for providing enclosure management services compatible with a multitude of physical interfaces and protocols for exchanging enclosure management data between an HBA and an enclosure management backplane.

In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Figure 1:
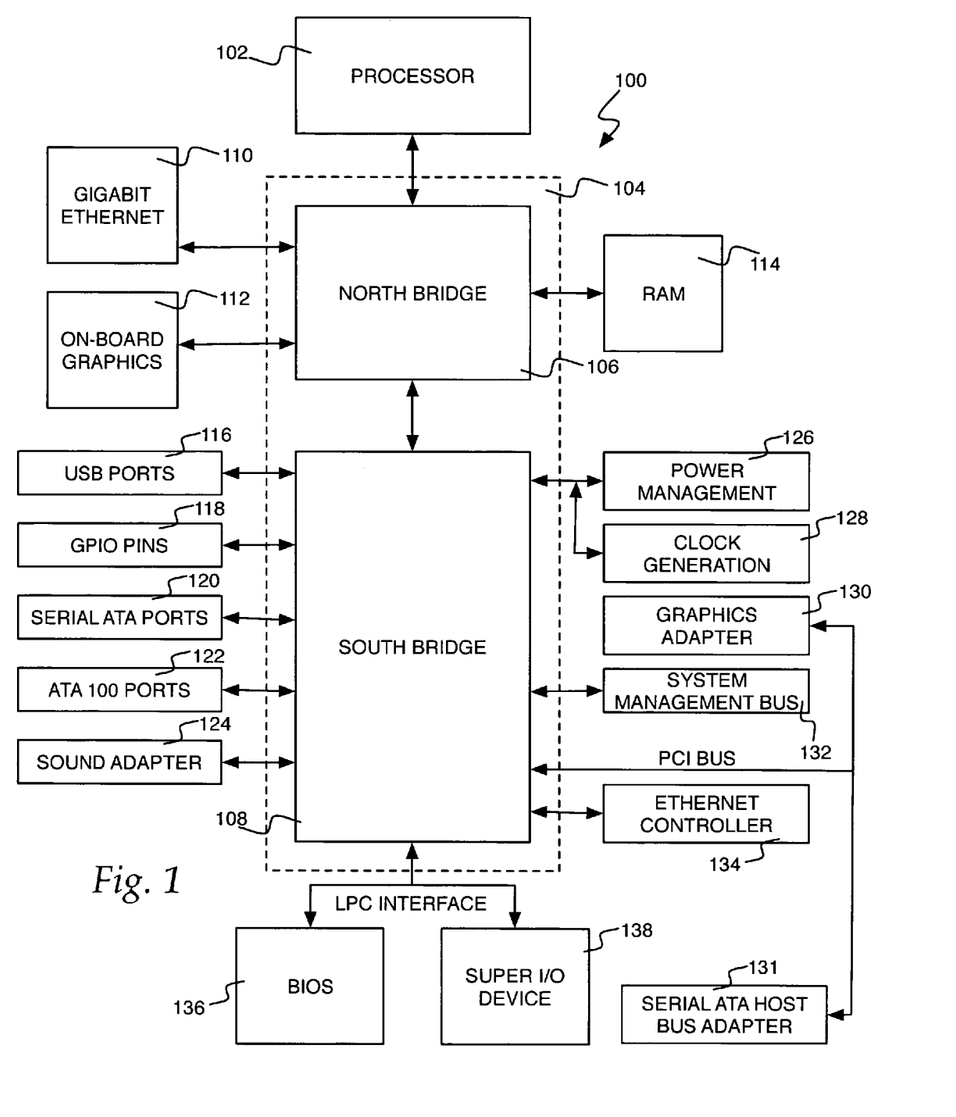
FIG. 1 is a computer architecture diagram showing aspects of a computer utilized as an illustrative operating environment for the various embodiments of the invention.

FIG. 1 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the invention will be provided. In particular, FIG. 1 illustrates a computer architecture for practicing the embodiments of the present invention. It should be appreciated, however, that although the embodiments of the invention described herein are discussed in the context of a conventional desktop or server computer, the embodiments of the invention may be utilized with virtually any type of computing device.

As described briefly above, the embodiments of the invention provide a method and integrated circuit for enabling the use of multiple enclosure management interfaces and multiple enclosure management protocols. FIG. 1 illustrates a host computer that, as will be described in greater detail below, may utilize one or more enclosure management backplanes to interface with one or more mass storage devices. The enclosure management backplanes described herein are equipped with an integrated circuit capable of utilizing multiple interfaces and protocols for exchanging enclosure management information with the computer 100 or with another computer equipped with an HBA utilizing a different enclosure management interface and protocol. It should be appreciated that the architecture of the computer 100 is merely illustrative and that any type of computer capable of hosting a HBA with enclosure management functionality may be utilized.

An illustrative computer architecture for practicing the various embodiments of the invention will now be described. In particular, a computer 100 is utilized that is equipped with a HBA. In order to provide this functionality, the computer 100 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the computer 100.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a system management bus 132 for use in managing the various components of the computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus. The PCI bus may also be utilized to interface with one or more HBAs, such as the serial ATA HBA 131. As described in greater detail below, the HBA 131 may be connected to an enclosure management backplane for providing enclosure management functionality.

According to embodiments, the south bridge 108 is an enhanced south bridge operative to provide a HBA for connecting mass storage devices to the computer 100 without the use of an add-in card such as the PCI HBA 131. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial ATA ports 120 may be connected to an enclosure management backplane for providing enclosure management functionality.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 of an extensible firmware interface ("EFI") compatible firmware that includes program code containing the basic routines that help to start up the computer 100 and to transfer information between elements within the computer 100. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
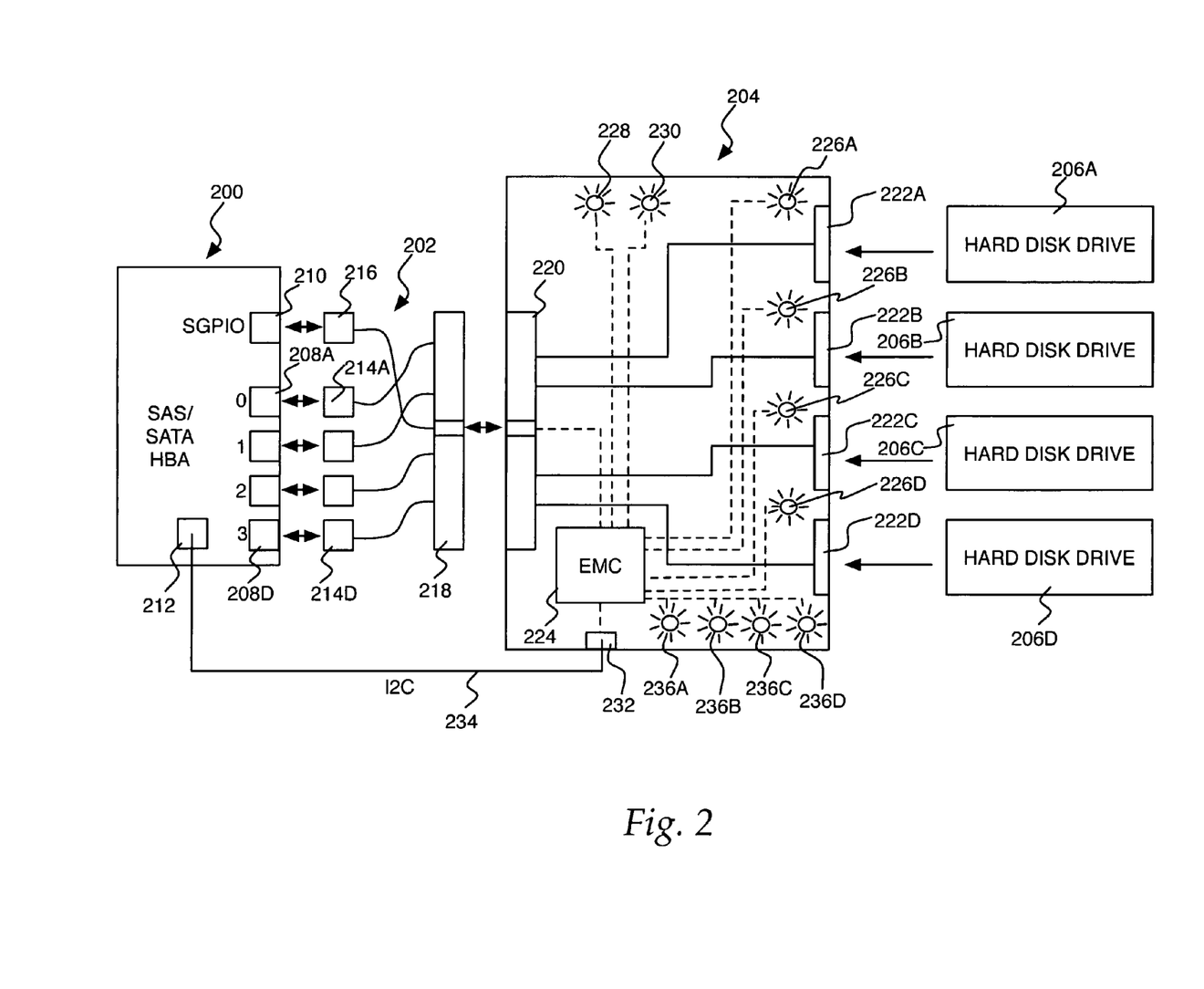
FIG. 2 is a block diagram illustrating aspects of a host bus adapter, enclosure management controller, and enclosure management backplane provided in embodiments of the invention.

Turning now to FIG. 2, additional details regarding one operating environment for the embodiments of the invention and an enclosure management backplane 204 provided in embodiments of the invention will be described. As shown in FIG. 2, an HBA 200 having one or more ports 208A-208D is utilized. According to embodiments of the invention, the HBA 200 comprises an HBA for use with SATA mass storage devices or an HBA compatible with SAS mass storage devices. It should be appreciated that other types of HBAs compatible with other types of mass storage devices may also be utilized.

According to embodiments of the invention, different physical interfaces may be utilized by the HBA 200 to exchange enclosure management data between the HBA 200 and the enclosure management backplane 204. For instance, some SAS-compatible HBAs are equipped with an SGPIO interface, while some SATA-compatible HBAs, on the other hand, utilize a control or management bus, such as the I²C bus from PHILIPS SEMICONDUCTORS, to exchange enclosure management data between the enclosure management backplane 204 and the HBA 200. In the case of an HBA 200 equipped with SGPIO, an SGPIO port 210 is included on the HBA 200 for making an appropriate connection with the backplane 204. When the HBA 200 is equipped with an I²C bus, an appropriate I²C port 212 is made available on the HBA 200 to communicate with the enclosure management backplane 204.

It should be appreciated that the particular physical interfaces described herein for exchanging enclosure management information with the backplane are merely illustrative and that any physical communications link suitable for transmitting enclosure management data may be utilized with the various aspects of the invention. The HBA may also support multiple enclosure management interfaces and protocols, such as I²C and SGPIO both, or some custom enclosure management bus. The HBA may have a jumper or additional pins on the cable or connectors used to carry the enclosure management interface from the HBA to the backplane. These additional pins may be used to communicate to the HBA which interface should be used, in the case where there are multiple options. Additionally, the HBA may use some form of automatic or default detection mechanism, where it would send out some data over the various available interfaces, and then either not receive a response on the interfaces where there is no available enclosure management device, or receive a response from a device that can acknowledge the response for the particular protocol that the HBA was sending out a query for. It is also possible that an HBA can be configured to support a particular enclosure management protocol by upgrading the firmware of the HBA, or by using host-side applications, command line utilities, or configuration monitors i.e. over a direct serial port to the HBA. This same access and configuration method could be used to change or otherwise configure specific instructions and commands that are sent to the enclosure management backplane.

As shown in FIG. 2, an appropriate cable may be utilized to connect the ports 208A-208D of the HBA 200 to the enclosure management backplane 204. In particular, individual cables may be utilized to connect the ports 208A-208D to the backplane 204. Alternatively, a multilane cable 202 may be utilized to connect the individual ports on the HBA 200 to a single multilane connector 220 on the backplane 204. It should be appreciated that the multilane cable 202 may be equipped with multilane connectors on both ends or only on one end, as shown in FIG. 2. Where the multilane cable 202 includes only one multilane connector 218, the other end may be configured with individual connectors 214A-214D compatible with the ports 208A-208D on the HBA 200. It should also appreciated that although the HBA 200 has been illustrated as having four ports 208A-208D, HBAs with other port configurations may be utilized. For instance, an HBA having eight ports may be utilized with two backplanes configured as shown in FIG. 2. Alternatively, the backplane 204 and the enclosure management controller integrated circuit 224 may be configured for use with either or more drives. Other configurations should also be apparent.

When the HBA 200 comprises an SAS-compatible HBA and includes a SGPIO port 210, the multilane cable 202 may further include an appropriate connector 216 for connecting to the SGPIO port 210. The multilane connector 218 is also appropriately configured for passing the side-band signals from the SGPIO port 210 to an appropriate portion of the multilane connector 220 on the backplane 204. When the HBA 200 comprises a SATA-compatible HBA and includes an I²C port 212, an appropriate I²C cable 234 may be utilized for connecting to the I²C port 212 on the HBA 200 an I²C port 232 on the enclosure management backplane 204. As will be described in greater detail below, the SGPIO signals are routed from the multilane connector 220 to an enclosure management integrated circuit ("IC") 224 on the enclosure management backplane 204 and the I²C signals are routed from the I²C connector 232 to the enclosure management integrated circuit ("IC") 224 on the enclosure management backplane 204. It should be appreciated that although illustrated in FIG. 2 as having both an I²C interface and an SGPIO interface, the HBA 200 is typically equipped with only one interface for exchanging management data with the backplane 204. The backplane 204 and the enclosure management controller IC 224, however, are configured to receive enclosure management information on multiple interfaces to thereby support the use many types and configurations of HBAs.

As also shown in FIG. 2, the enclosure management backplane 204 includes ports 222A-222D for directly interfacing with one or more mass storage devices, such as the hard disk drives 206A-206D. According to embodiments of the invention, the backplane 204 may be mounted within an enclosure such that the hard disk drives 206A-206D slide directly into the enclosure and thereby mate directly with the appropriate port 222A-222D. The backplane 204 also includes circuitry for routing signals to and from the ports 222A-222D to the appropriate portions of the multilane connector 220. In this manner, the backplane 204 enables direct communication between then HBA 200 and the connected hard disk drives 206A-206D.

As discussed briefly above, the enclosure management backplane 204 provides a number of enclosure management functions. To enable this functionality, the enclosure management backplane 204 is equipped with an enclosure management IC 224. The enclosure management IC 224 is operative to receive enclosure management data from the HBA 200 on one of any number of physical interfaces, such as $I^2C$ and SGPIO, and to perform various management functions in response to receiving this data. For instance, the enclosure management IC 224 may receive data from the HBA 200 instructing it to illuminate one of the LEDs 226A-226D for locating a particular one of the hard disk drives 206A-206D. The enclosure management IC 224 may also illuminate the LEDs 226A-226D to indicate activity on the hard disk drives 206A-206D. The LEDs 236A-236D may also be illuminated by the enclosure management IC 224 to indicate that one of the hard disk drives 206A-206D has failed. LEDs 228, 230 may also be illuminated to provide a global indication that one of the hard disk drives 206A-206D, or a hard disk drive connected to another connected backplane, is active or has failed. The enclosure management IC 224 may also provide information to the HBA 200. For instance, data indicating whether a particular drive is mated to the backplane 204 may be provided by the enclosure management controller IC 224 to the HBA 200. Additional details regarding the configuration and operation of the enclosure management controller IC 224 are provided below with respect to FIG. 3.

Figure 3:
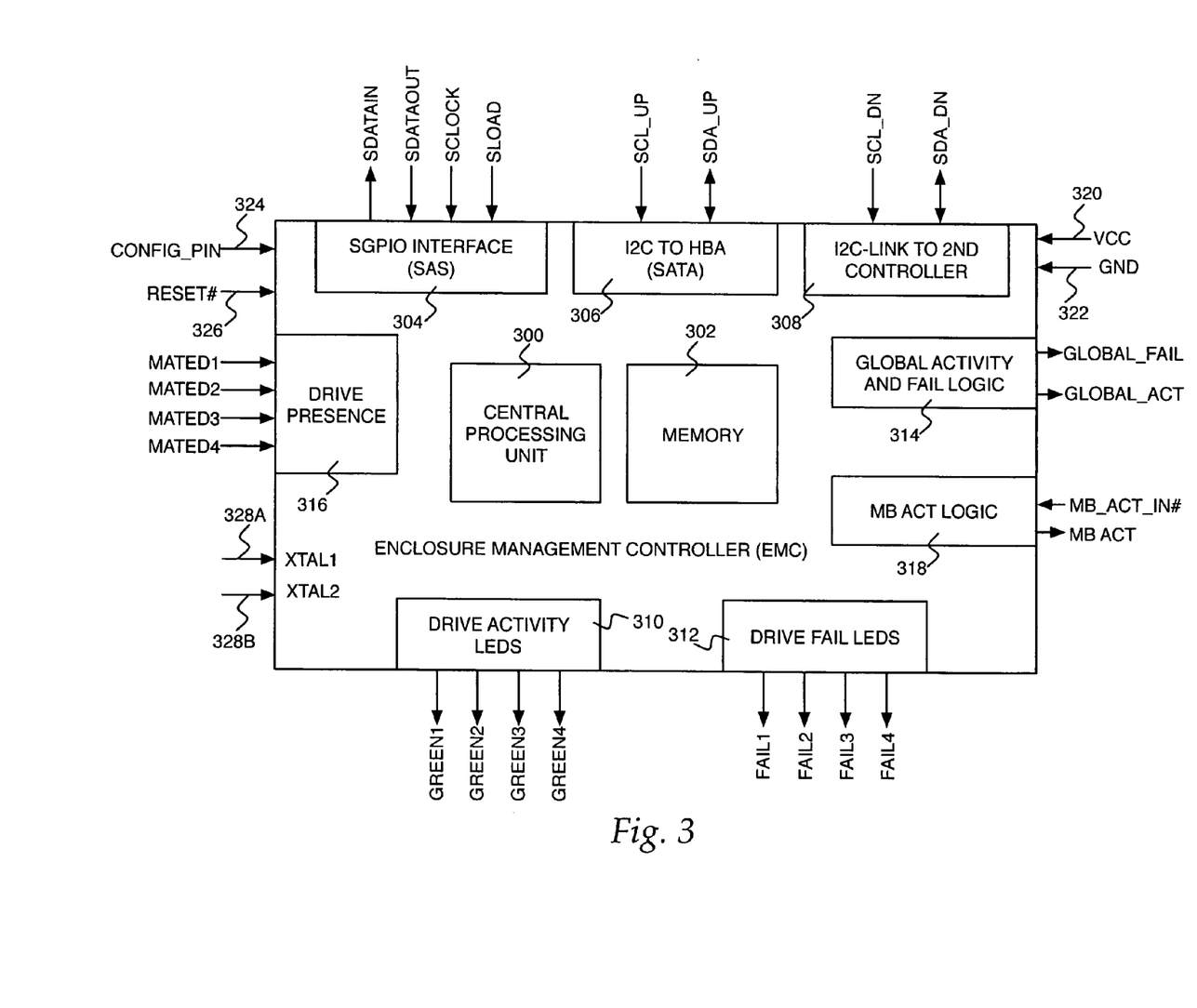
FIG. 3 is a functional block diagram illustrating aspects of an enclosure management controller semiconductor integrated circuit provided in embodiments of the invention.

Referring now to FIG. 3, a functional block diagram illustrating aspects of an enclosure management controller IC provided in embodiments of the invention will be described. As shown in FIG. 3, the enclosure management IC includes a CPU 300 and memory 302. The CPU 300 controls the overall operation of the IC as described herein. The memory 302 may be utilized by the CPU 300 during the performance of its processing functions. It should be appreciated that although the IC is described herein as a programmable micro-controller including a CPU 300 and memory 302, the embodiments of the invention may be implemented utilizing a general purpose computer, a custom application specific integrated circuit, a field-programmable gate array device, or any other type of IC or computing known to those skilled in the art.

According to embodiments, the enclosure management IC shown in FIG. 3 is equipped with multiple physical interfaces for communicating enclosure management data with an HBA. For instance, the IC may include an SGPIO interface 304 for communicating enclosure management data with an SAS-equipped HBA. The SGPIO interface 304 supports four signals: SDATAOUT, the serial data output bit stream from the initiator; SDATAIN, the serial output stream to the initiator; SCLOCK, the clock signal from the initiator; and SLOAD, the last clock of a bit stream from the initiator. The use of these signals is known to those skilled in the art.

According to embodiments of the invention, the enclosure management IC is also equipped with an $I^2C$ interface 306 for communicating enclosure management data with a SATA HBA. The interface 306 includes two signals: SCL_UP, the serial clock line for connection to the HBA or another upstream $I^2C$ device; and SDA_UP, the serial data line for connection to the HBA or another upstream $I^2C$ device. An interface 308 may also be provided for connecting to a downstream $I^2C$ device. The interface 308 includes two signals: SCL_DN, the serial clock line for connection to a downstream $I^2C$ device; and SDA_DN, the serial data line for connection to a downstream $I^2C$ device. As will be described in greater detail below, the interfaces 306 and 308 may be utilized to connect multiple enclosure management controller ICs, and thereby support enclosure management functions for a large number of mass storage devices. As will also be described in detail below, the enclosure management controller IC is also operative to determine which of the physical interfaces 304 or 306 is connected to an HBA and being used for exchanging enclosure management data, and to selectively utilize only the active interface.

According to embodiments of the invention, the enclosure management controller IC also includes circuitry for generating output signals for driving a visual or audible indicator. For instance, an output portion 310 may be provided for driving LEDs when one or more of the connected hard disk drives are active. Similarly, an output portion 312 may be provided for driving LEDs when one or more of the connected hard disk drives has failed. It should be appreciated that a separate output is provided for driving an individual LED indicating the activity or failure of each hard disk drive.

According to other embodiments of the invention, the enclosure management controller IC also includes circuitry 314 for driving an indicator showing global activity and global failure. It should be appreciated that these outputs may be configured to either drive an LED directly or to connect to an upstream IC. In this manner, the activity and failure or drives connected to one IC may be communicated to additional upstream ICs. Additional details regarding this functionality are provided below.

The enclosure management controller IC may also be equipped with circuitry 318 for generating a motherboard activity display. This circuitry 318 may include an input for receiving motherboard activity from a downstream IC (MB_ACT_IN#) and an output (MB_ACT) for driving an LED or communicating a motherboard activity signal to an upstream IC. The IC may also include circuitry 316 for receiving a signal from each of the hard disk drives indicating that the drive has been mated with the backplane. This information may then be communicated to the HBA. The enclosure management controller IC also includes an input 320 for receiving an appropriate voltage for powering the operation of the IC (typically +5V DC), an input 322 for connecting to ground, inputs 238A-238B for receiving an appropriate clock signal, an input 324 for enabling a configuration of the IC, and a reset input 326 for resetting the operation of the IC. Additional details regarding the operation of the enclosure management controller IC are provided below with respect to FIGS. 4-7.

Figure 4:
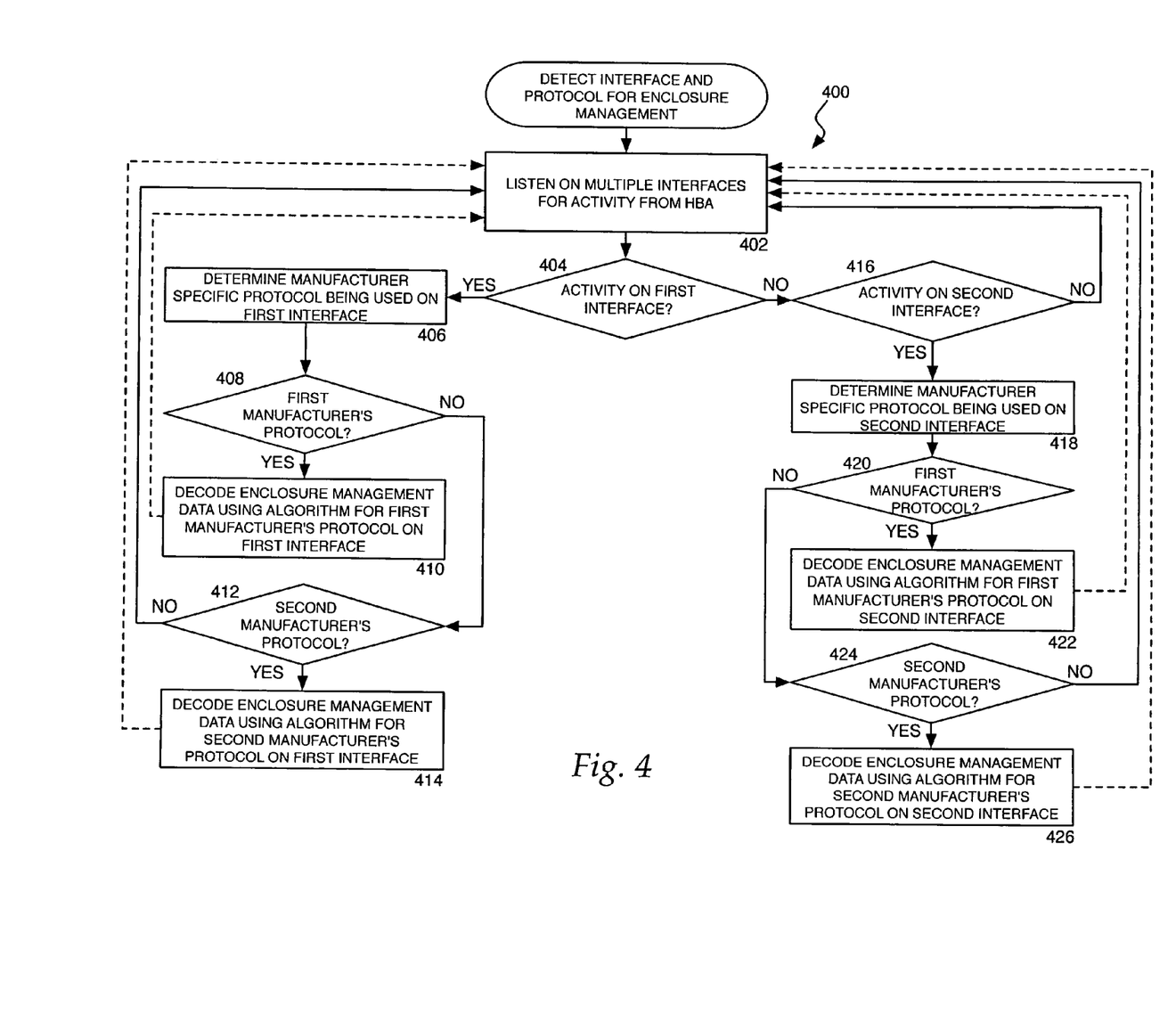
FIG. 4 is a flow diagram illustrating aspects of a method provided in one embodiment of the invention for detecting an interface and a protocol to be utilized for providing enclosure management services.

Referring now to FIG. 4, additional details regarding the operation of the enclosure management controller IC 224 will be provided. In particular, a routine 400 will be described illustrating operations performed by the IC 224 for supporting multiple enclosure management interfaces and protocols will be described. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 4 and 7 making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

As described briefly above, the particular protocol utilized to transfer enclosure management data between an enclosure management backplane and the HBA may also vary from solution to solution. For instance, the SCSI Accessed Fault-Tolerant Enclosures Interface Specification ("SAF-TE") is typically utilized with SATA HBAs utilizing the $I^2C$ management bus. Alternatively, the SGPIO protocol may be utilized with a SAS HBA utilizing an SGPIO interface to exchange enclosure management information between an HBA and an enclosure management backplane. Additionally, HBA manufacturers may define their own proprietary protocols. In many cases, an HBA manufacturer will utilize a standard protocol, such as SGPIO or SAF-TE, as the foundation for its protocol but will modify the standard protocol to define its own proprietary protocol. For instance, an HBA manufacturer may change the order that data is presented or add particular proprietary data to the protocol. The routine 400 illustrates how the enclosure management controller IC determines the physical interface and the protocol being utilized by a connected HBA according to one embodiment of the invention.

The routine 400 begins at operation 402, where the enclosure management controller IC listens, or monitors, each of the physical interfaces to determine if data has been received from an HBA on the interface. For instance, according to embodiments, the IC listens on both the SGPIO interface 304 and the $I^2C$ interface 306 to determine if an HBA is transmitting data. From operation 402, the routine 400 continues to operation 404, where the IC determines if activity has been detected on the first interface (the SGPIO interface 304, for instance). If activity has been detected on the first interface, the routine 400 branches from operation 404 to operation 406. If activity has not been detected on the first interface, the routine 400 branches from operation 404 to operation 416, where a determination is made by the IC as to whether activity has been detected on a second interface (the $I^2C$ interface 306, for instance). If activity has not been detected on the second interface, the routine 400 branches back to operation 402, where the IC continues to listen on the various interfaces for signs of a connected HBA. If activity is detected on the second interface, the routine 400 continues from operation 416 to operation 418. Once activity has been detected on an interface, the IC is operative to identify the particular protocol being used on the interface, including any manufacturer-specific protocols, and to decode the data utilizing the identified protocol. This process is described below.

At operation 406, a determination is made as to whether the data received on the first interface corresponds to a manufacturer specific protocol. This determination may be accomplished, for instance, by examining the actual data received on the active interface. In particular, data identifying the manufacturer, and thereby identifying the protocol, may be identified in the enclosure management data stream. The ordering of data bytes within the enclosure management data may also be particular to certain manufacturers and thereby indicate the protocol being used. Additionally, key bytes may be present within the enclosure management data that identify the manufacturer of the HBA and thereby also identify the protocol being used. For instance, certain manufacturers may encode predefined data values at certain predefined locations within a stream of enclosure management data. Likewise, the destination memory addresses specified within certain bytes of enclosure management data may provide an indication as to the manufacturer of the HBA and, therefore, to the protocol utilized to encode the data. It should also be appreciated that different industry standard protocols and different protocols defined by the same manufacturer may be identified by the IC in a similar fashion.

From operation 406, the routine 400 continues to operation 408 where the IC determines if a protocol specific to a first HBA manufacturer was identified. If such a protocol was identified, the routine 400 continues to operation 410, where data received on the active interface is decoded according to the first manufacturer's protocol. Decoding continues until such time as a power cycle or reset occurs at which time the routine 400 returns to operation 402. If a protocol specific to a first manufacturer is not identified at operation 408, the routine 400 branches to operation 412.

At operation 412, the IC determines if a protocol specific to a second HBA manufacturer was identified. If such a protocol was identified, the routine 400 continues to operation 414, where data received on the active interface is decoded according to the second manufacturer's protocol. Decoding continues until such time as a power cycle or reset occurs at which time the routine 400 returns to operation 402. If a protocol specific to a second manufacturer was not identified, the routine 400 returns from operation 412 to operation 402, where it begins again.

At operation 418, a determination is made as to whether the data received on the second interface corresponds to a manufacturer specific protocol. This determination may be accomplished, in the manner described above for examining various aspects of the received data to identify the manufacturer of the HBA and the protocol being utilized. From operation 418, the routine 400 continues to operation 420 where the IC determines if a protocol specific to a first HBA manufacturer was identified on the second interface. If such a protocol was identified, the routine 400 continues to operation 422, where data received on the second interface is decoded according to the first manufacturer's protocol. Decoding continues until such time as a power cycle or reset occurs at which time the routine 400 returns to operation 402. If a protocol specific to a first manufacturer is not identified at operation 418, the routine 400 branches from operation 420 to operation 424.

At operation 424, the IC determines if a protocol specific to a second HBA manufacturer was identified as being used on the second interface. If such a protocol was identified, the routine 400 continues to operation 426, where data received on the second interface is decoded according to the second manufacturer's protocol. Decoding continues until such time as a power cycle or reset occurs at which time the routine 400 returns to operation 402. If a protocol specific to a second manufacturer was not identified, the routine 400 returns from operation 424 to operation 402, where it begins again.

Figure 5:
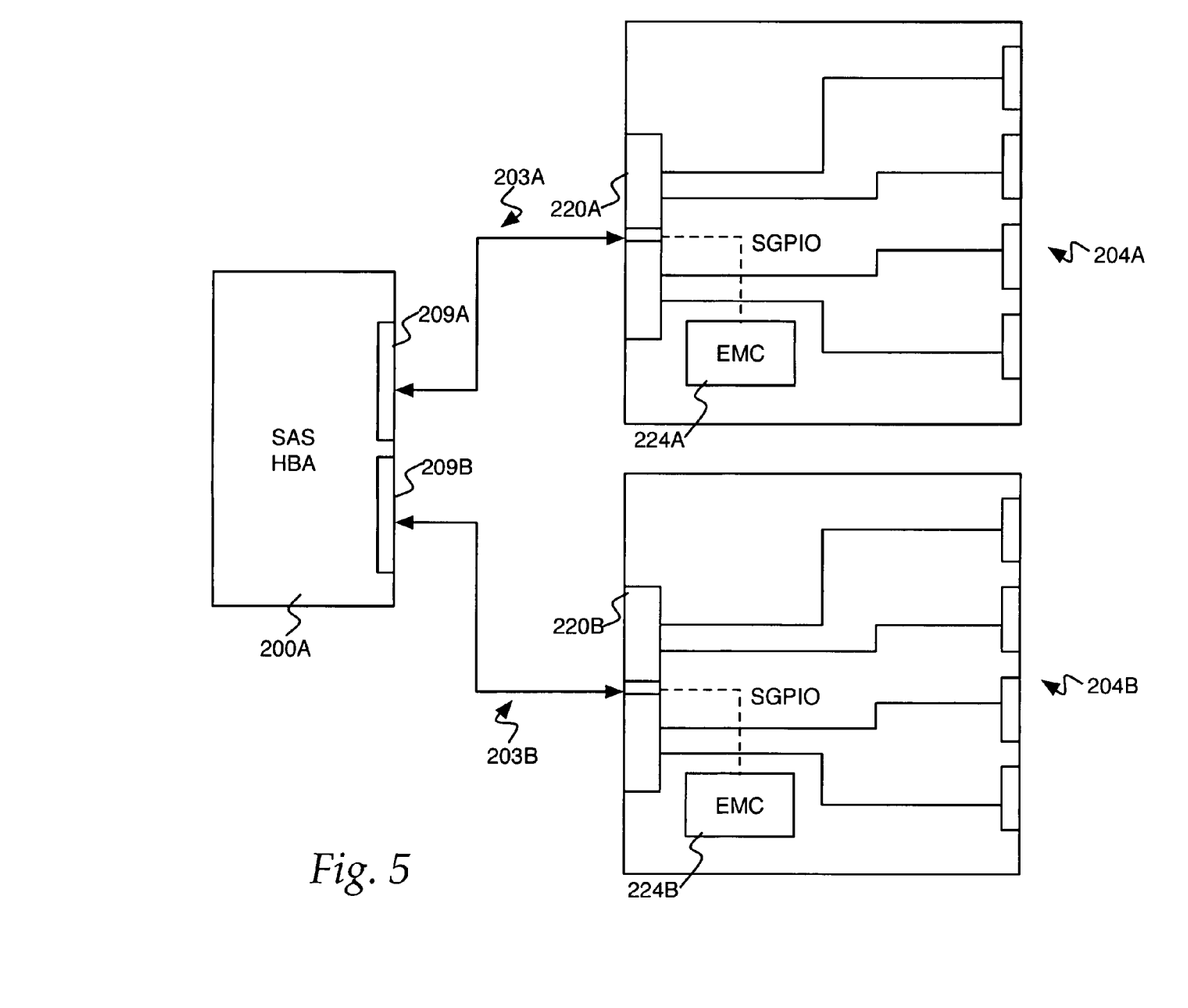
FIGS. 5 and 6 are block diagrams illustrating the use of multiple enclosure management controller integrated circuits according to embodiments of the invention.

Turning now to FIG. 5, a block diagram illustrating the use of multiple enclosure management controller ICs according to one embodiment of the invention will be described. As shown in FIG. 5, an SAS HBA 200A may be utilized in embodiments of the invention that is equipped with eight output ports accessible through two multilane connectors 209A and 209B. In this embodiment, a first multilane cable 203A is utilized to connect the HBA 200A to a first backplane 204A via the multilane connector 220A. A second multilane cable 203B is utilized to connect the HBA 200A to a second backplane 204B via the multilane connector 220B. The SGPIO signals received at the multilane connector 220A are routed to the enclosure management IC 224A on the backplane 204A. Similarly, the SGPIO signals received at the multilane connector 220B are routed to the enclosure management controller IC 224B on the backplane 204B. In this manner, a single HBA 200A can communicate enclosure management data with multiple backplanes and enclosure management controller ICs. It should be appreciated that the backplanes 204A and 204B and the ICs 224A and 224B are configured to provide the functionality described above.

Figure 6:
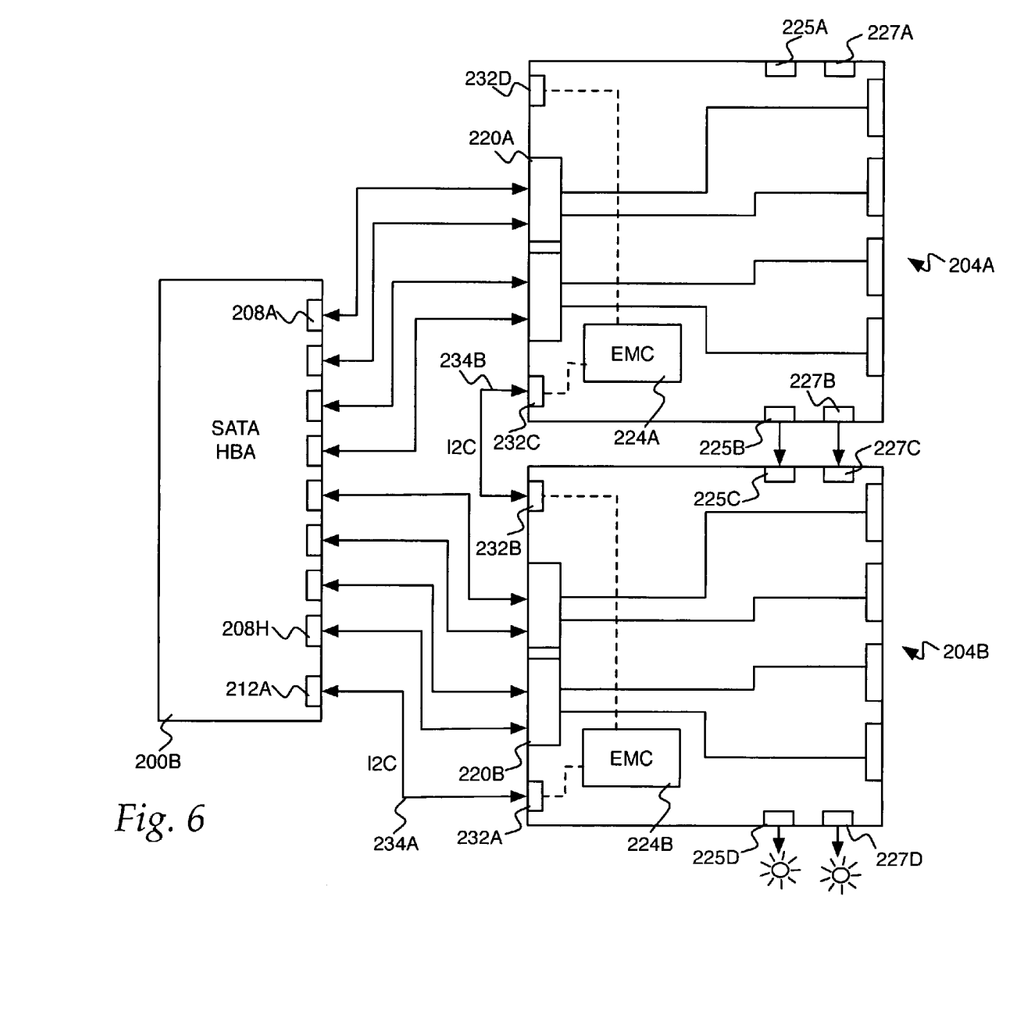

Referring now to FIG. 6, a block diagram illustrating the use of multiple enclosure management controller integrated circuits according to another embodiment of the invention will be described. In the example shown in FIG. 6, a SATA HBA 200B is utilized having eight individual SATA ports 208A-208H. Four of the ports are connected to the backplane 204A while the remaining four are connected to the backplane 204B. A multilane cable or single cables may be utilized for these connections. Additionally, the I$^2$C port 212A on the HBA is connected to the HBA port 232A on the backplane 204B using the I$^2$C cable 234A. To enable the communication of the I$^2$C signals to the backplane 204A, an additional I$^2$C cable 234B is utilized to connect the downstream I$^2$C port 232B of the backplane 204B to the I$^2$C port 232C of the backplane 204A. In a similar manner, additional backplanes may be connected to the I$^2$C port 232D of the backplane 204A. In this manner, each of the backplanes in use are connected using the I$^2$C bus.

As described above, the enclosure management controller IC provided herein is operative to drive indicators for global activity or the global failure of a connected hard disk drive. So that these indicators are truly global, these signals may be passed between connected backplanes. For instance, a global activity signal may be passed between the backplanes 204A and 204B through a connection between the ports 225A and 225C. Similarly, a global failure signal may be passed between the backplanes 204A and 204B through a connection between the ports 227B and 227C. The backplane 204B may be configured to actually drive the indicators themselves through a connection to the ports 225D and 227D.

Figure 7:
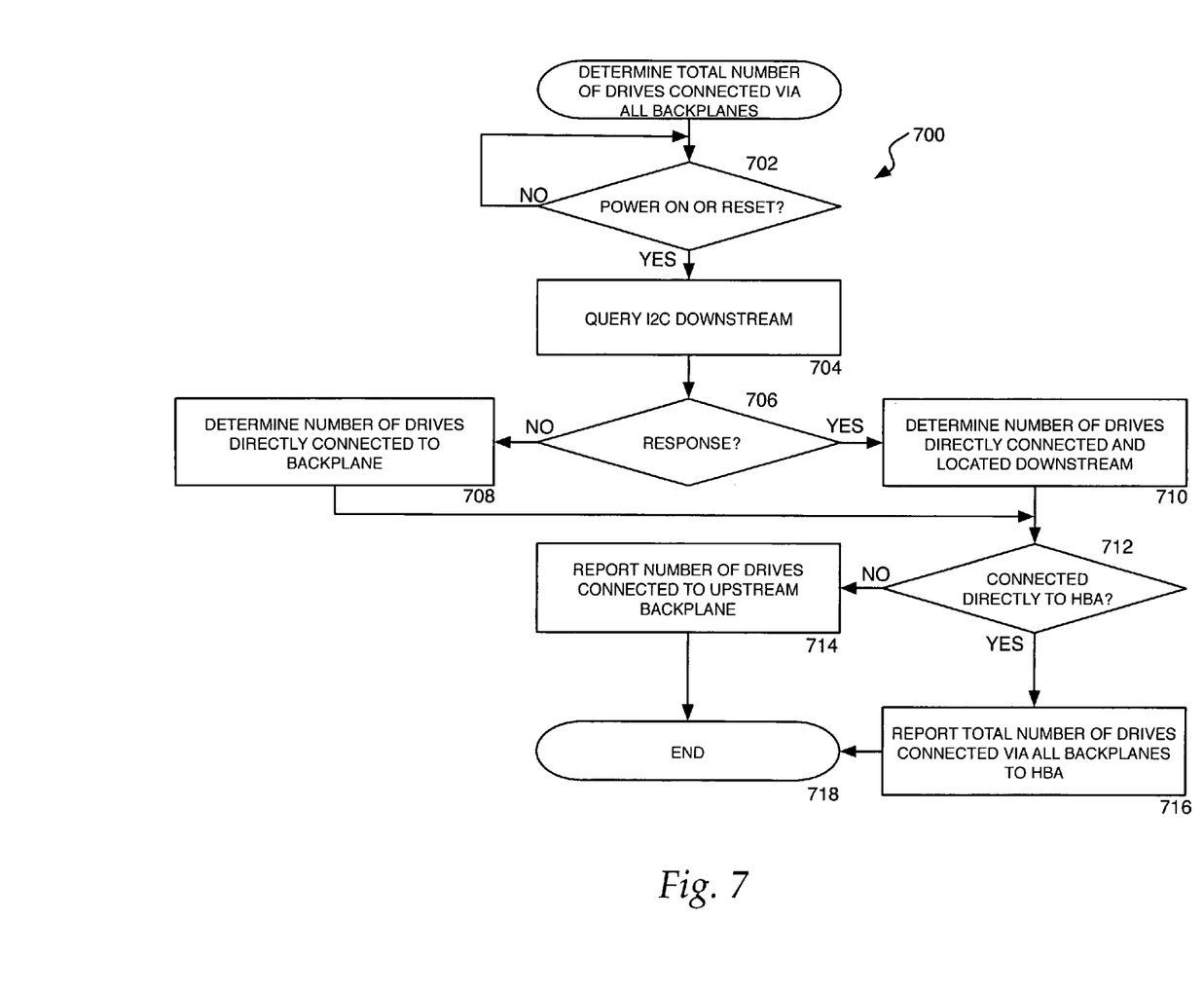
FIG. 7 is a flow diagram illustrating aspects of a method provided in one embodiment of the invention for reporting the total number of data storage devices connected to a multitude of enclosure management backplanes to a host bus adapter.

Turning now to FIG. 7, a flow diagram illustrating aspects of a method provided in one embodiment of the invention for reporting the total number of data storage devices connected to a multitude of enclosure management backplanes to a host bus adapter will be described. In order to communicate to a single HBA the total number of mass storage devices connected to all present backplanes, it is necessary for each enclosure management controller IC to determine the number of connected devices and to pass this information upstream so that the total number of devices can be correctly reported to the HBA. The routine 700 illustrates a method for performing this process according to one embodiment of the invention.

The routine 700 begins at operation 702, where a determination is made as to whether a power cycle or a reset has been performed. If no power cycle or reset has been performed, the routine 700 branches back to operation 702. If a power cycle or reset has been performed, the routine 700 continues to operation 704. At operation 704, the enclosure management controller IC transmits a query on the downstream I$^2$C port. The routine 700 then continues to operation 706, where the IC determines if a response was received to the query. If no response was received, this indicates that no additional ICs are connected downstream. Accordingly, the routine 700 branches to operation 708 where the IC determines the number of devices connected only to the backplane on which it is mounted.

If a response is received to the downstream I$^2$C query, the routine 700 branches from operation 706 to operation 710, where the IC determines the number of devices connected to the backplane on which it is mounted and the number of devices located downstream. The number of devices located downstream will be reported by the downstream IC when it performs the routine 700. From operation 712, a determination is made by the IC as to whether it is connected directly to the HBA with no additional upstream ICs present. If so, the routine 700 branches to operation 716, where the IC reports the total number of devices connected to all backplanes to the HBA. If not, the routine 700 branches to operation 714, where the IC reports the number of devices connected and downstream to the upstream IC. From operations 714 and 716, the routine 700 continues to operation 718, where it ends.

It will be appreciated that embodiments of the present invention provide a method and integrated circuit for supporting enclosure management functionality with multiple physical interfaces and protocols. Although the invention has been described in language specific to computer structural features, methodological acts and by computer readable media, and implementations utilizing a semiconductor integrated circuit, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An integrated circuit for providing enclosure management services compatible with a plurality of enclosure management interfaces and with a plurality of enclosure management protocols defined by two or more manufacturers, the integrated circuit comprising:

a first interface for receiving enclosure management data, the first interface comprising a serial general purpose input/output interface;

a second interface for receiving enclosure management data, the second interface comprising an I$^2$C interface;

a processing portion for monitoring the first and second interfaces, determining if either the first or second interfaces is active by determining if data has been received on one of the interfaces, determining if data received on an active interface is formatted according to a protocol defined by a first manufacturer or a protocol defined by a second manufacturer, to decode the data received on the active interface utilizing the protocol defined by the first manufacturer in response to determining that the data is formatted according to the protocol defined by the first manufacturer, and to decode the data received on the active interface utilizing the protocol defined by the second manufacturer in response to determining that the data is formatted according to the protocol defined by the second manufacturer;

a first output portion for generating an indication that a mass storage device is active in response to receiving enclosure management data on the active interface indicating that the mass storage device is active;

a second output portion for generating an indication that a mass storage device has failed in response to receiving enclosure management data on the active interface indicating that the mass storage device has failed; and a third output portion for generating an indication that any one of a plurality of mass storage devices is active, and for generating an indication that any one of a plurality of mass storage devices has failed in response to instructions received on the active interface from a host bus adapter.

2. The integrated circuit of claim 1, wherein the processing portion is configured to determine whether data received on the active interface corresponds to the enclosure management protocol defined by the first manufacturer or to the enclosure management protocol defined by the second manufacturer by detecting an ordering of bytes within the data utilized by either the first manufacturer or the second manufacturer.

3. The integrated circuit of claim 1, wherein the processing portion is configured to determine whether data received on the active interface corresponds to the enclosure management protocol defined by the first manufacturer or to the enclosure management protocol defined by the second manufacturer by identifying one or more key bytes in the data utilized by the first manufacturer or the second manufacturer.

4. The integrated circuit of claim 1, wherein the processing portion is configured to determine whether data received on the active interface corresponds to the enclosure management protocol defined by the first manufacturer or to the enclosure management protocol defined by the second manufacturer by identifying one or more destination memory addresses for the data utilized by the first manufacturer or the second manufacturer.

5. The integrated circuit of claim 1, further comprising a third interface for communicating data received on the first interface and/or the second interface to another enclosure management device.

6. A method for providing enclosure management services compatible with a plurality of enclosure management interfaces and with a plurality of enclosure management protocols defined by two or more manufacturers, the method comprising:
   receiving data associated with enclosure management at a first interface;
   receiving data associated with enclosure management at a second interface;
   monitoring the first and second interfaces;
   determining if either the first or second interfaces is active by determining if data has been received on one of the interfaces;
   determining if data received on an active interface is formatted according to a protocol defined by a first manufacturer or a protocol defined by a second manufacturer;
   decoding the data received on the active interface utilizing the protocol defined by the first manufacturer in response to determining that the data is formatted according to the protocol defined by the first manufacturer;
   decoding the data received on the active interface utilizing the protocol defined by the second manufacturer in response to determining that the data is formatted according to the protocol defined by the second manufacturer;
   generating an indication that a mass storage device is active in response to receiving enclosure management data on the active interface indicating that the mass storage device is active; and
   generating an indication that a mass storage device has failed in response to receiving enclosure management data on the active interface indicating that the mass storage device has failed.

7. The method of claim 6, wherein receiving data associated with enclosure management at the first interface comprises receiving data at a serial general purpose input/output interface.

8. The method of claim 6, wherein receiving data associated with enclosure management at the second interface comprises receiving data at an I²C interface.

9. The method of claim 6, wherein determining if data received on the active interface is formatted according to the protocol defined by the first manufacturer or the protocol defined by the second manufacturer comprises detecting an ordering of bytes within the data utilized by either the first manufacturer or the second manufacturer.

10. The method of claim 6, wherein determining if data received on the active interface is formatted according to the protocol defined by the first manufacturer or the protocol defined by the second manufacturer comprises identifying one or more key bytes in the data utilized by the first manufacturer or the second manufacturer.

11. The method of claim 6, wherein determining if data received on the active interface is formatted according to the protocol defined by the first manufacturer or the protocol defined by the second manufacturer comprises identifying one or more destination memory addresses for the data utilized by the first manufacturer or the second manufacturer.

12. The method of claim 6, further comprising communicating data received on the first interface and/or the second interface to another enclosure management device over a third interface.

13. A system of circuit modules configured to provide enclosure management services compatible with a plurality of enclosure management interfaces and with a plurality of enclosure management protocols by:
   receiving data associated with enclosure management at a first interface;
   receiving data associated with enclosure management at a second interface;
   monitoring the first and second interfaces;
   determining if either the first or second interfaces is active by determining if data has been received on one of the interfaces;
   determining if data received on an active interface is formatted according to a protocol defined by a first manufacturer or a protocol defined by a second manufacturer;
   decoding the data received on the active interface utilizing the protocol defined by the first manufacturer in response to determining that the data is formatted according to the protocol defined by the first manufacturer;
   decoding the data received on the active interface utilizing the protocol defined by the second manufacturer in response to determining that the data is formatted according to the protocol defined by the second manufacturer;
   generating an indication that a mass storage device is active in response to receiving enclosure management data on the active interface indicating that the mass storage device is active; and
   generating an indication that a mass storage device has failed in response to receiving enclosure management data on the active interface indicating that the mass storage device has failed.

14. The system of claim 13, wherein receiving data associated with enclosure management at the first interface comprises receiving data at a serial general purpose input/output interface.

15. The system of claim 13, wherein receiving data associated with enclosure management at the second interface comprises receiving data at an I²C interface.

16. The system of claim 13, wherein determining if data received on the active interface is formatted according to the protocol defined by the first manufacturer or the protocol defined by the second manufacturer comprises detecting an ordering of bytes within the data utilized by either the first manufacturer or the second manufacturer.

17. The system of claim 13, wherein determining if data received on the active interface is formatted according to the protocol defined by the first manufacturer or the protocol defined by the second manufacturer comprises identifying one or more key bytes in the data utilized by the first manufacturer or the second manufacturer.

18. The system of claim 13, wherein determining if data received on the active interface is formatted according to the protocol defined by the first manufacturer or the protocol defined by the second manufacturer comprises identifying one or more destination memory addresses for the data utilized by the first manufacturer or the second manufacturer.

19. The system of claim 13, wherein the circuit modules are further configured to communicate data received on the first interface and/or the second interface to a third interface, the third interface operable to connect to another enclosure management device.

* * * * *